Feb. 10, 1970  J. L. CRITCHER  3,494,260
ACTUATOR
Filed Nov. 8, 1967  3 Sheets-Sheet 1
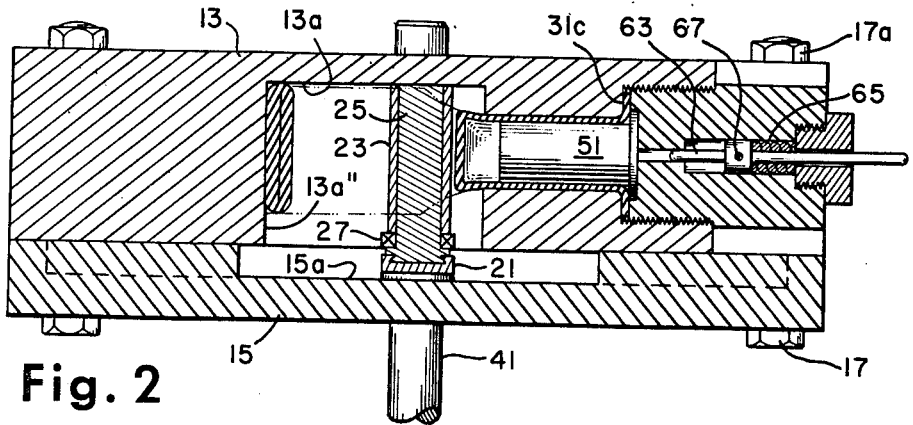
Fig. 2
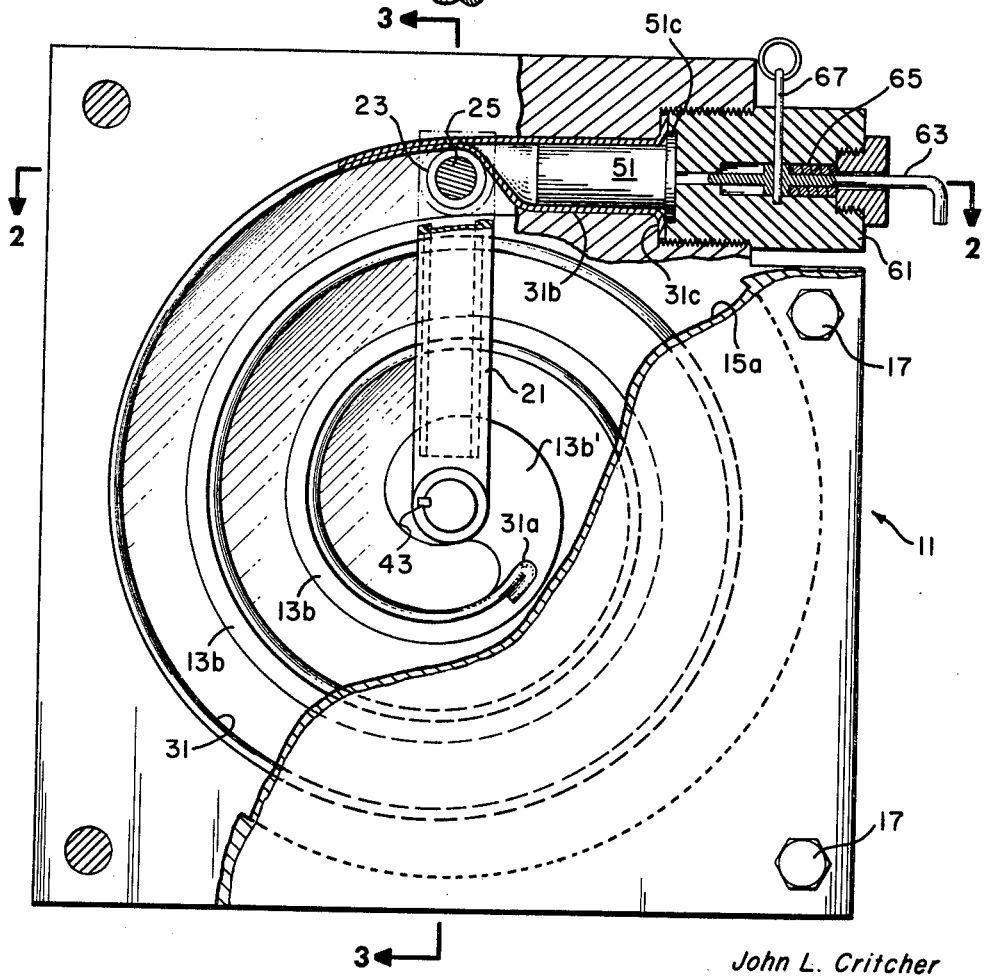
Fig. 1
John L. Critcher
INVENTOR
ATTORNEY Feb. 10, 1970    J. L. CRITCHER    3,494,260
ACTUATOR Filed Nov. 8, 1967    3 Sheets-Sheet 2

John L. Critcher
INVENTOR

ATTORNEY

John L. Critcher
INVENTOR

United States Patent Office 3,494,260
Patented Feb. 10, 1970

3,494,260
ACTUATOR
John L. Critcher, Cockeysville, Md., assignor to AAI Corporation, Cockeysville, Md., a corporation of Maryland
Filed Nov. 8, 1967, Ser. No. 681,328
Int. Cl. F01b *19/00, 9/00;* F16j *3/00*
U.S. Cl. 92—91                           3 Claims

ABSTRACT OF THE DISCLOSURE

An actuator is disclosed in the form of a flattened tube closed at one end and connected to a source of fluid pressure at the other end for forced expansion from the flattened condition. The tube is disposed in a spiral guideway in which rides a roller on a crank arm connected in driving relation to a shaft. Pressurized expansion of the tube effects spiral orbiting of the roller to rotate the crank arm and shaft.

DISCLOSURE

This invention relates to fluid pressure actuators, and more particularly to a fluid pressure actuator employing a spiral or helically formed tube for translation of fluid pressure into torque and rotary motion.

There is often a need for an economical torque generator for relatively short cycle duration. Short duration torque generating actuators employing pyrotechnic energy sources have been employed, such as hero engines, etc.; however, such pyrotechnic actuators have, to my knowledge, operated with extensive exhaust of combustion products, resulting in inefficiency, as well as the frequently undesirable side effect of exhausting the combustion products into the surrounding area at the time of torque generation.

It is a feature of the present invention to provide a torque generating actuator which is particularly adapted to short cycle applications, which is lightweight, capable of high energy output, and is relatively low in cost.

It is a further feature to provide a torque generating actuator which is operated by a fluid pressure source, and particularly a pyrotechnic gas generator, in which the fluids from the fluid pressure source are sealed from the surrounding atmosphere.

Still other objects, features and attendant advantages will become apparent to those skilled in the art from a reading of the following detailed description of one illustrative physical embodiment of the invention, taken in conjunction with the accompanying drawings, wherein:

FIG. 1 is an end view of an embodiment of the invention, with portions partially cut away for clarity of illustration.

FIG. 2 is a section view of line 2—2 of FIG. 1.

Figure 7:
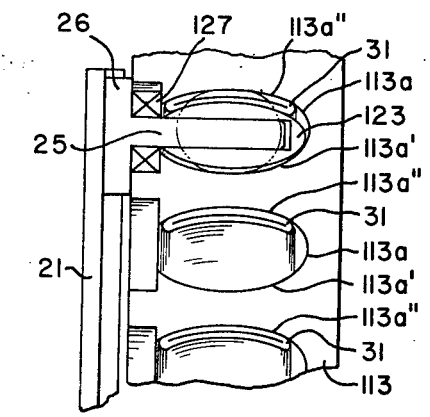
FIG. 7 is a schematic illustration of a modification according to the invention.
Figure 3:
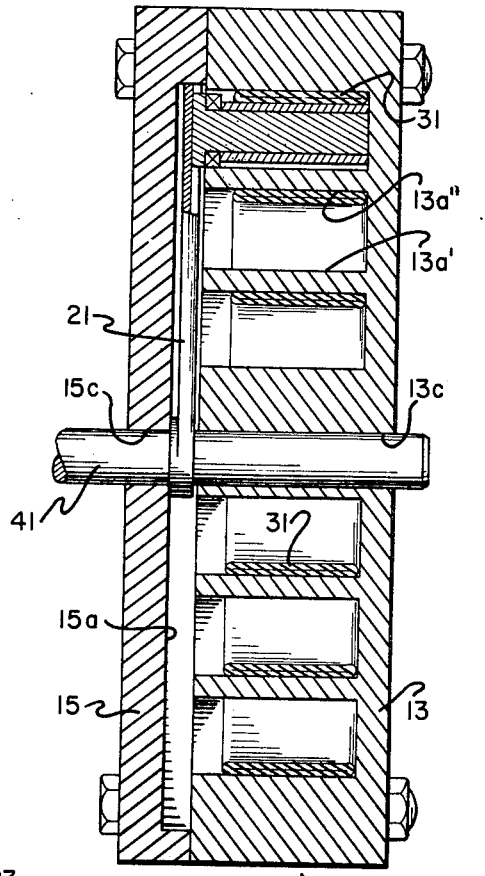
FIG. 3 is a section view on line 3—3 of FIG. 1.
Figure 4:
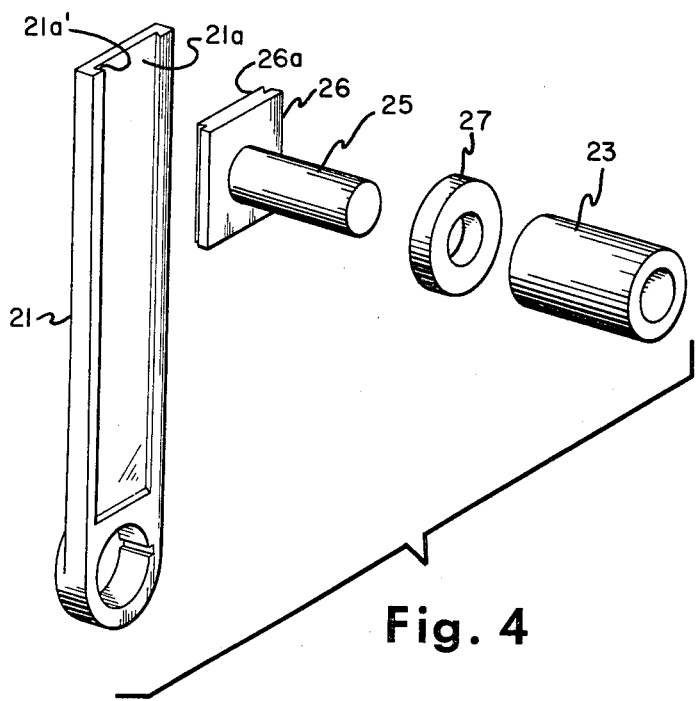
FIG. 4 is a schematic exploded view of the crank arm and roller of FIG. 1.

Referring now in detail to the figures of the drawings, the embodiment of a torque generating actuator as shown in FIGS. 1–6 takes the form of a container 11 having a base plate 13 and a cover plate 15 secured together as by bolts 17 and nuts 17a.

Figure 5:
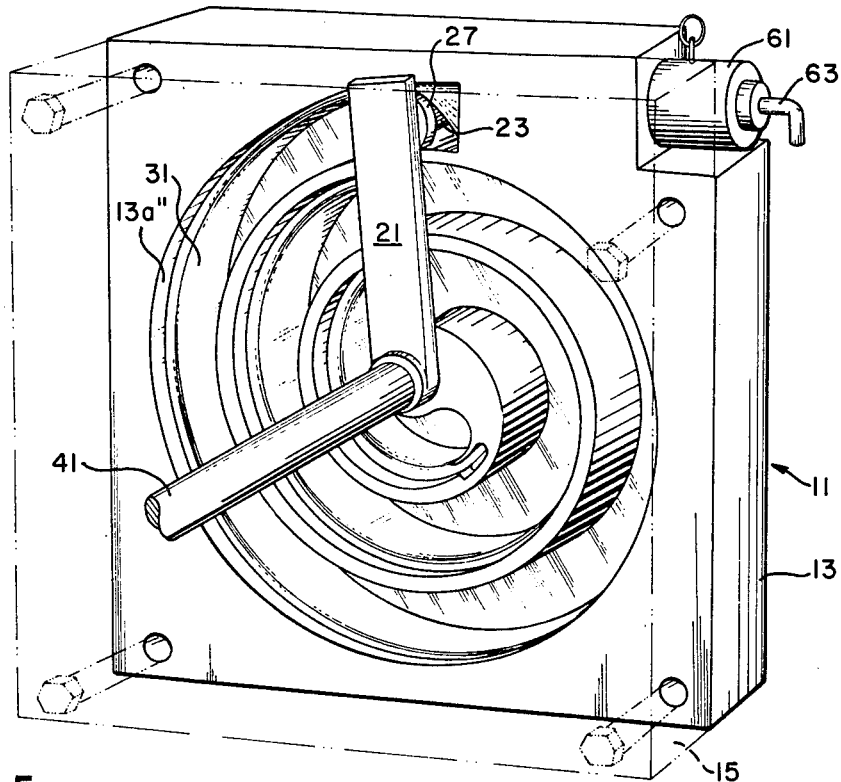
FIG. 5 is a perspective view of the embodiment of FIG. 1.

A spiral groove 13a is formed in the face of base plate 13, into which is fitted a collapsed or flattened energy transfer tube 31, preferably formed of malleable metal such as aluminum or nickel, or other suitable material. The inner end 31a of tube 31 is sealed closed, as by reverse crimping as shown in FIGS. 1 and 5, and is anchored as by a light fit in a complementary slot formed in the inner end 13b' of the spiral guideway 13b formed along the spiral groove 13a.

The opposite end of tube 31 is flared open and connects with a fluid pressure source in the form of a percussion actuated pyrotechnic propellant-gas-pressure generating cartridge 51 which is fitted within the open mouth 31b of the tube. The tube 31 and cartridge 51 may be suitably removably secured in sealed relation as by a cap plug 61 which is threadedly pulled tight against tube flange 31c and cartridge flange 51c.

Propellant-gas-generating cartridge 51 may take any conventional or other desired internal construction, not shown, including in the illustrated embodiment a percussion primer, not shown, centrally disposed at the flanged head end 51c, and actuated by a firing pin 63 slidably disposed in cap plug 61. An actuating spring 65 biases the firing pin 63 toward the firing position against the cartridge 51, and the firing pin 63 is normally held against actuation as by a safety release pin 67.

Cover plate 15 has a face recess 15a formed therein to accommodate a crank arm 21 fixedly secured as by a key connection on an output shaft 41 which extends in freely rotatable relation through journal openings formed in the base plate 13 and cover plate 15. Crank arm 21 carries a roller follower 23 which extends into the spiral groove 13a between the radially inner facing surface of the tube 31 and the radially outer facing wall 13a' of the spiral groove, and is in the initial position disposed in the outer end of groove 13a aganst the inclined flared junction section of the open mouth end 31b of tube 31, as shown in FIGS. 1 and 5.

Roller follower 23 is rotatably disposed on a pin or shaft 25 formed on a slide 26 which is slidably carried by crank arm 21 as through a dovetail groove 21a on arm 21 and complementary dovetail tongue 26a formed on slide 26.

A guide roller or bearing 27 may be and is preferably disposed on the shaft 25 with roller follower 23, and serves to engage the outer facing radially inner wall 13a' of spiral groove 13 during energy-translating orbiting motion of the roller follower 23 during the expansion of tube 31. Engagement of the wall 13a' by guide bearing or roller 27 thereby serves to maintain a clearance between roller follower 23 and the surface of wall 13a', thus enabling relatively free retrograde rolling action of the roller follower upon expansion of tube 31 thereagainst, with consequent minimum drag on the orbiting energy transfer motion of the follower 23. In addition, the guide roller or bearing 25 holds the roller follower 23 firmly against the collapsed tube 31, to prevent any material leak-by of propellant gas which if substantial in quantity could cause reverse thrust and possible jamming or reduction of efficiency of the mechanism.

Figure 6:
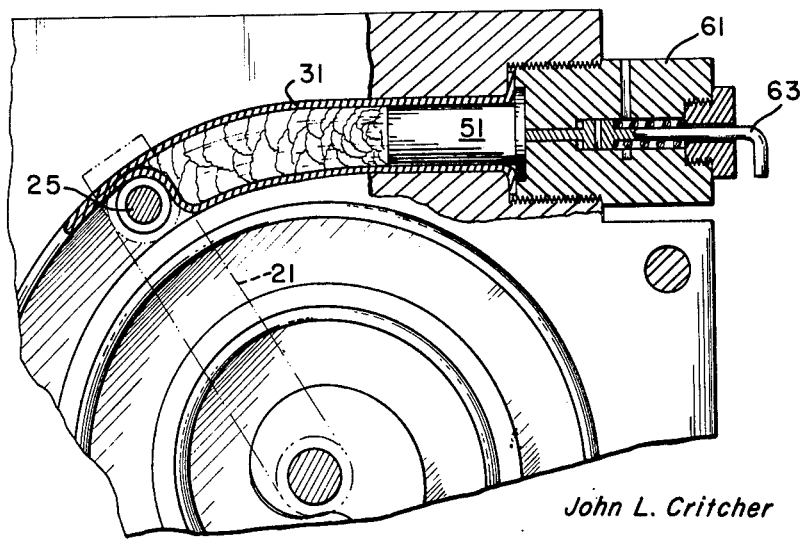
FIG. 6 is a fragmentary view of the embodiment, illustrating the operation of the device.

In operation, safety release pin 67 is pulled free, and firing pin 63 is abruptly forced against the percussion primer end of cartridge 51 to fire the cartridge and effect the discharge of propellant gas into the tube 31, thereby incrementally expanding the tube 31 against roller follower 23 which is thereby driven in an orbiting counterclockwise path as viewed in FIGS. 1, 5 and 6 by the expanding tube wall, as illustrated in FIG. 6. This incremental expansion of energy transfer tube 31 continues, with the roller follower 23 being orbited along the groove 13 ahead of the expanding tube wall, the crank arm 21 and output shaft 41 being thereby rotated in a counterclockwise direction while the roller follower and associated slide 26 orbit inwardly toward the terminal position adjacent the shaft 41. The propellant charge in the cartridge may be, and is preferably, suitably quantitized to yield only a full extension of the tube 31 to the bottoming end position of roller follower against the inner end of groove 13, without blowout after stopping. If desired, a resilient buffer stop of rubber or other suitable material, not shown, may be disposed at the inner end of groove 13 to aid in absorbing any shock from bottoming of the roller follower 23 at the end of the orbiting motion, particularly in the instances where very rapid shaft rotation is desired and effected. It will be apparent, however, that either fast or slow rotation may be effected by choice of propellants with suitable burning rates, or by employing other suitable fluid pressure generating means, including liquid or gas injection systems.

A modification is illustrated in FIG. 7, in which the follower roller 123 on slide 26 is crowned, preferably in a generally elongated spheroidal shape, and the groove 113a formed in base plate 113 has concave radially inner and outer wall surfaces 113a. Guide bearing or roller 127 rides in a corresponding adjacent flat surfaced spiral groove on the inner face of base plate 113. Tube 31 is smoothly cradled against the radially inner facing outer concave groove surface 113a'' and expands against the opposite concavely curved groove wall 113a', hereby affording a more accommodating confining groove surface for the expanding energy transfer tube 31. Otherwise, operation is substantially identical to that of the embodiment of FIGS. 1–6.

While the invention has been illustrated and described with reference to two illustrative embodiments, it will be apparent to those skilled in the art that various modifications and improvements may be made without departing from the scope and spirit of the invention. For instance, instead of stopping the follower 23 and crank arm 21 by bottoming of the follower 23 against an inner end of the spiral groove 13, the inner end of the groove 13 may be terminated after the end of tube 31 in a continuous circular reentry groove, thereby enabling freewheeling rotation of the shaft 41 with its associated crank arm and roller follower 23 after full expansion of the tube 31 and passage of the roller beyond the end of the tube and into the reentrant circularly continuous groove. In addition, while the outside-to-inside orbiting movement of the follower 23 by tube 31 is preferred, particularly with its larger initial torque arm, the invention may in some instances find a desired practice with inside-out motion of the follower 23 by placing the fluid pressure generator or generating inlet at the radially inner end of the energy transfer tube. Further, in lieu of a decreasing radius spiral actuator, the actuator tube may in some instances be helically formed, with corresponding follower motion.

That which is claimed is:

1. A torque and rotary motion generating actuator comprising a laterally collapsed tube formed in a curved configuration about an axis and having an opening adjacent one end thereof for connection to a fluid pressure source for expansion thereof, and a rotary crank member having a follower thereon disposed adjacent and adapted to be moved about said axis by incremental expansion of said tube from one end thereof, a guide member having a curved guideway formed therein, said tube and follower being disposed in said guideway, said guideway having oppositely interfacing guide surfaces each of which is concavely arcuate in cross-section, and said follower including a roller having a convexly crowned outer surface.

2. A torque and rotary motion generating actuator comprising a laterally collapsed tube formed in a curved configuration about an axis and having an opening adjacent one end thereof for connection to a fluid pressure source for expansion thereof, and a rotary crank member having a follower thereon disposed adjacent and adapted to be moved about said axis by incremental expansion of said tube from one end thereof, a guide member having a curved guideway formed therein, said tube and follower being disposed in said guideway, said curved guideway being formed in a spiral about said axis, means for slidably engaging said follower with said crank member in a direction radial to said axis.

3. A torque and rotary motion generating actuator comprising a laterally collapsed tube formed in a curved configuration about an axis and having an opening adjacent one end thereof for connection to a fluid pressure source for expansion thereof, and a rotary crank member having a follower thereon disposed adjacent and adapted to be moved about said axis by incremental expansion of said tube from one end thereof, a guide member having a curved guideway formed therein, said tube and follower being disposed in said guideway, said follower comprising a roller engageable in driven relation by said tube and disposed on a shaft, means for slidably carrying said shaft on said crank arm member, and a further roller disposed on said shaft and engaging said curved guideway.

References Cited

UNITED STATES PATENTS

| | | | |
|---|---|---|---|
| 312,106 | 2/1885 | Fajen | 92—90 X |
| 2,864,341 | 12/1958 | Novak | 92—90 |
| 2,893,356 | 7/1959 | Murray | 92—90 X |
| 3,014,459 | 12/1961 | Gustairs | 92—90 X |
| 3,045,611 | 7/1962 | Murray | 92—90 X |
| 3,109,283 | 11/1963 | Sawyer | 60—26.1 |
| 3,360,096 | 12/1967 | Moore et al. | 92—90 X |

MARTIN P. SCHWADRON, Primary Examiner

I. C. COHEN, Assistant Examiner

U.S. Cl. X.R.

92—140